United States Patent
Zhuang et al.

(10) Patent No.: US 10,594,489 B2
(45) Date of Patent: Mar. 17, 2020

(54) METHOD AND DEVICE FOR PROCESSING SERVICE REQUEST

(71) Applicant: Alibaba Group Holding Limited, George Town (KY)

(72) Inventors: Weiming Zhuang, Hangzhou (CN); Ning Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/507,822

(22) Filed: Jul. 10, 2019

(65) Prior Publication Data

US 2019/0334725 A1 Oct. 31, 2019

Related U.S. Application Data

(63) Continuation of application No. PCT/CN2018/079416, filed on Mar. 19, 2018.

(30) Foreign Application Priority Data

Mar. 21, 2017 (CN) .......................... 2017 1 0168014

(51) Int. Cl.
*H04L 9/32* (2006.01)
*H04L 9/06* (2006.01)
*H04L 9/00* (2006.01)

(52) U.S. Cl.
CPC ............ *H04L 9/3236* (2013.01); *H04L 9/008* (2013.01); *H04L 9/0637* (2013.01); *H04L 9/3247* (2013.01); *H04L 2209/38* (2013.01)

(58) Field of Classification Search
CPC .... H04L 9/3236; H04L 9/3247; H04L 9/0637
See application file for complete search history.

(56) References Cited

U.S. PATENT DOCUMENTS

| 2016/0164884 A1* | 6/2016 | Sriram | G06Q 10/06315 705/51 |
| 2016/0292672 A1* | 10/2016 | Fay | G06Q 20/363 |

(Continued)

FOREIGN PATENT DOCUMENTS

| AU | 2016100394 | 5/2016 |
| CN | 102724044 | 10/2012 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ponnoreay Pich
(74) *Attorney, Agent, or Firm* — Fish & Richardson P.C.

(57) ABSTRACT

Implementations of the present application disclose a method and device for processing a service request. If a service request passes consensus verification, each consensus node stores a digest of service data in a blockchain, instead of storing the service data in the blockchain. As such, the digest of the service data is stored in the trustworthy blockchain, and authenticity of the service data can still be verified. In addition, the service data is not stored in the blockchain so that the service data cannot be obtained by a blockchain node irrelevant to the target service. Therefore, each consensus node does not need to consume computing resources to encrypt the service data any more, thereby improving efficiency of performing consensus verification on the service request by each consensus node.

6 Claims, 5 Drawing Sheets

(56) References Cited

U.S. PATENT DOCUMENTS

2018/0218003 A1\* 8/2018 Banga ................ G06F 16/137
2018/0253451 A1\* 9/2018 Callan ................ H04L 9/3239

FOREIGN PATENT DOCUMENTS

| CN | 105975868 | 9/2016 |
| CN | 106100981 | 11/2016 |
| CN | 106230851 | 12/2016 |
| CN | 106534273 | 3/2017 |
| CN | 107196989 | 9/2017 |
| CN | 107239479 | 10/2017 |
| KR | 101712726 | 3/2017 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2018/079416, dated Jun. 21, 2018, 10 pages (with partial English translation).
European Extended Search Report in European Patent Application No. 18770564.5, dated Oct. 29, 2019, 10 pages.

\* cited by examiner

METHOD AND DEVICE FOR PROCESSING SERVICE REQUEST

CROSS-REFERENCE TO RELATED APPLICATIONS

This application is a continuation of PCT Application No. PCT/CN2018/079416, filed on Mar. 19, 2018, which claims priority to Chinese Patent Application No. 201710168014.8, filed on Mar. 21, 2017, and each application is hereby incorporated by reference in its entirety.

TECHNICAL FIELD

The present application relates to the field of information technologies, and in particular, to a method and device for processing a service request.

BACKGROUND

A blockchain network is also referred to as a distributed ledger network characterized by decentralization and transparency. A blockchain network includes blockchain nodes, and each blockchain node is used to synchronize a blockchain.

In the existing technology, a method for processing a service request is as follows: A certain blockchain node participating in a certain service broadcasts a service request of the service to each consensus node (a blockchain node responsible for consensus verification) in a blockchain network. The service request includes service data of the service and a digest of the service data. The service data includes detailed information of the service (for example, private information of the blockchain node participating in the service). The digest of the service data is generated based on the service data, and can be used to verify authenticity of the service data. After the service request passes the consensus verification performed by each consensus node, the consensus node encrypts the service data and stores the encrypted service data and the digest in a blockchain, to prevent a blockchain node irrelevant to the service from obtaining some private information in the service data of the service when being synchronized with the blockchain.

However, not only computation loads on each consensus node are greatly increased if each consensus node encrypts service data included in each service request passing consensus verification, efficiency of performing consensus verification on the service request by each consensus node is also reducing.

SUMMARY

Implementations of the present application provide a method and device for processing a service request, to alleviate a problem of relatively low efficiency when each consensus node performs consensus verification on a service request in the existing method for processing a service request.

To alleviate the previous technical problem, the implementations of the present application are implemented as follows:

An implementation of the present application provides a method for processing a service request, including: receiving a service request corresponding to a target service, where the service request includes service data of the target service and a digest of the service data; performing consensus verification on the service request based on the service data and the digest; and storing the digest in a blockchain in response to determining that the service request passes the consensus verification.

An implementation of the present application provides another method for processing a service request, including: receiving, by a consensus node, a service request corresponding to a target service, where the service request includes service data of the target service and a digest of the service data; performing consensus verification on the service request based on the service data and the digest; and instructing each non-consensus node to store the digest in a blockchain in response to determining that the service request passes the consensus verification.

An implementation of the present application provides a device for processing a service request, including: a receiving module, configured to receive a service request corresponding to a target service, where the service request includes service data of the target service and a digest of the service data; a consensus verification module, configured to perform consensus verification on the service request based on the service data and the digest; and a storage module, configured to store the digest in a blockchain in response to determining that the service request passes the consensus verification.

An implementation of the present application provides a device for processing a service request, including: a receiving module, configured to receive a service request corresponding to a target service, where the service request includes service data of the target service and a digest of the service data; a consensus module, configured to perform consensus verification on the service request based on the service data and the digest; and a storage module, configured to instruct each non-consensus node to store the digest in a blockchain in response to determining that the service request passes the consensus verification.

It can be seen from the technical solutions provided in the implementations of the present application that in the implementations of the present application, in response to determining that the service request passes the consensus verification, each consensus node stores the digest of the service data in the blockchain, instead of storing the service data in the blockchain. As such, the digest of the service data is stored in the trustworthy blockchain, and authenticity of the service data can still be verified. In addition, the service data is not stored in the blockchain so that the service data cannot be obtained by a blockchain node irrelevant to the target service. Therefore, each consensus node does not need to consume computing resources to encrypt the service data any more, thereby improving efficiency of performing consensus verification on the service request by each consensus node.

BRIEF DESCRIPTION OF DRAWINGS

To describe the technical solutions in implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

The implementations of the present application provide a method and device for processing a service request.

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
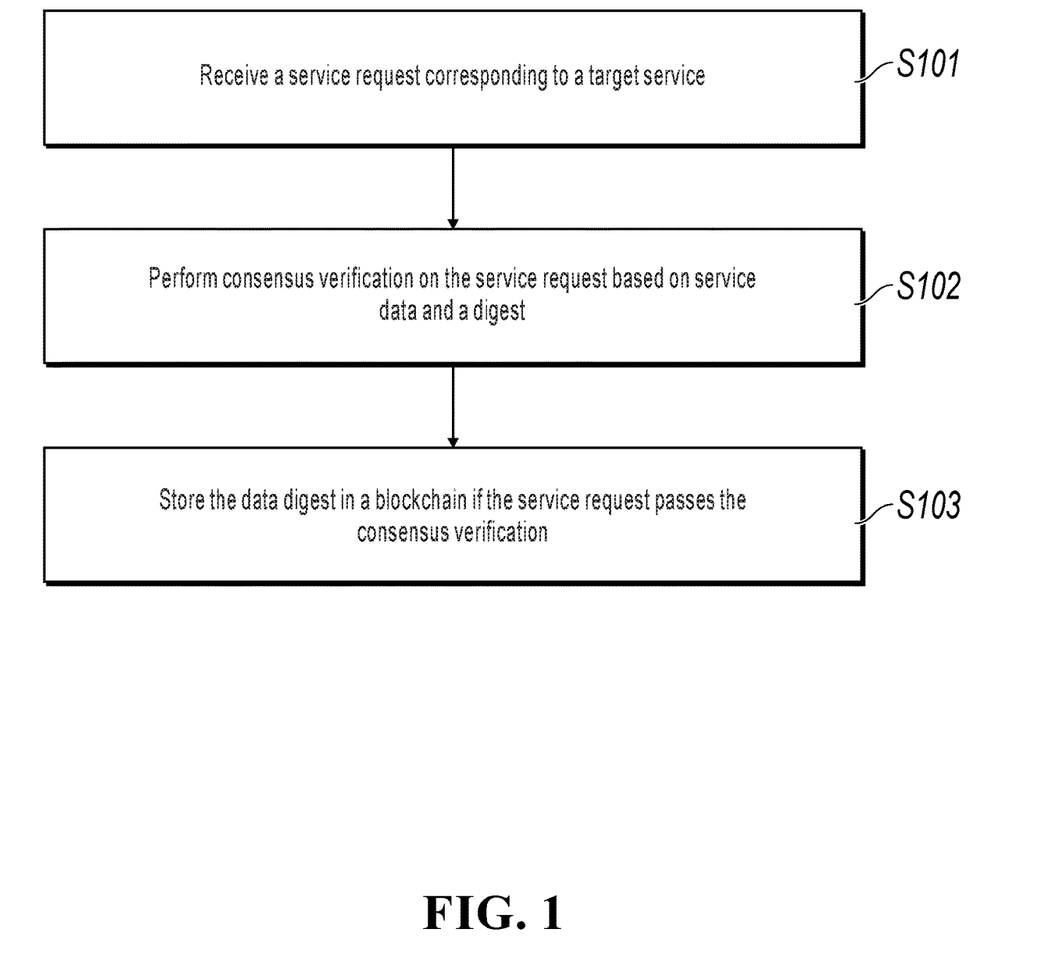
FIG. 1 is a flowchart illustrating a method for processing a service request, according to an implementation of the present application.

FIG. 1 is a flowchart illustrating a method for processing a service request, according to an implementation of the present application. The method for processing a service request includes the following steps:

S101. Receive a service request corresponding to a target service.

The method can be executed by a consensus node. In a blockchain network, each consensus node is a blockchain node responsible for consensus verification. For the target service, a blockchain node participating in the target service is a service node. The service node can serve as a consensus node to participate in consensus verification on the target service.

In conclusion, the method is executed by at least a consensus node responsible for consensus verification, and the consensus node can further be a service node participating in the target service. This is not limited in the present application.

The consensus node can receive a service request broadcast by a certain service node (which can be a service node initiating a target service), or can receive a service request further broadcast by another consensus node (which is a handling node for a service request) after the service request is received.

It is worthwhile to note that consensus nodes participating in consensus verification can receive the service request in different ways. Some consensus nodes can serve as handling nodes to directly receive the service request sent by the service node, and some consensus nodes can receive the service request further broadcast by the handling node. Alternatively, each consensus node can directly receive a service request broadcast by a service node. This is not limited in the present application.

In this implementation of the present application, the service request includes service data of the target service and a digest of the service data.

The service request corresponding to the target service is to request each consensus node to perform consensus verification on the service data of the target service and the digest of the service data, to be specific, to verify whether the service data is tampered with (whether the service data is consistent with the digest), and whether the service data that is not tampered with is authentic and trustworthy (for example, whether an account balance is sufficient for payment, for example, whether duplicate expenses exist).

In the field of blockchain technologies, a digest is a string of characters generated based on service data, a digest can be used as a "data fingerprint" of the service data, and the service data and the digest of the service data are always strictly consistent with each other. In other words, the plaintext service data cannot be inferred based on the digest, a slight change of the service data causes a corresponding change to the digest generated based on the service data. The digest of the service data can be generated based on a unidirectional hash function (for example, MD5 or SHA-1), or can be generated based on another function, as long as the service data cannot be inferred based on the digest.

S102. Perform consensus verification on the service request.

S103. Store a digest in a blockchain in response to determining that the service request passes the consensus verification.

In this implementation of the present application, each consensus node performs consensus verification on the service request after receiving the service request. In response to determining that the service request passes the consensus verification (in other words, the service data is not tampered with and the service data is authentic and trustworthy), each consensus node stores the digest included in the service request in the blockchain, instead of storing the service data in the blockchain.

In this implementation of the present application, each consensus node stores the verified digest of the service data in the blockchain. In other words, the blockchain endorses that the service data of the target service is authentic and trustworthy. The service data is not stored in the blockchain so as to prevent a blockchain node irrelevant to the target service from viewing the service data.

When authenticity of service data declared by a certain service node needs to be verified, a digest can be obtained from the service data declared by the service node, and then, the obtained digest is compared with the digest stored in the blockchain. If inconsistent, it indicates that the service data declared by the service node is untrustworthy. Such mechanism can be used to effectively avoid a case that a service node denies the target service after the target service passes the consensus verification performed by each consensus node and is acknowledged by the blockchain.

Based on the method for processing a service request shown in FIG. 1, in this implementation of the present application, in response to determining that the service request passes the consensus verification, each consensus node stores the digest of the service data in the blockchain, instead of storing the service data in the blockchain. As such, the digest of the service data is stored in the trustworthy blockchain, and authenticity of the service data can still be verified. In addition, the service data is not stored in the blockchain so that the service data cannot be obtained by a blockchain node irrelevant to the target service. Therefore, each consensus node does not need to consume computing resources to encrypt the service data any more, thereby improving efficiency of performing consensus verification on the service request by each consensus node.

In addition, in this implementation of the present application, although the service data is not stored in the blockchain, each service node can store the service data by itself in its own private database because each service node is usually concerned about the service data. It is worthwhile to note that each blockchain node can have its own private database, or the blockchain nodes can share one private database but each blockchain node can access only data related to it. As such, the service data stored in the private database of the service node can be preserved by the service node. In addition, the service data is not leaked to a blockchain node irrelevant to the target service (each blockchain node is authorized to access only data of it stored in the blockchain, but cannot access to a private database of another blockchain node).

Certainly, data stored in the private database of the blockchain node cannot be endorsed by each consensus node. Theoretically, the blockchain node can modify the data stored in the private database of itself at will. However, the blockchain stores the digest corresponding to the target service. In this case, service data of the target service advocated by any blockchain node (including the service node) can be acknowledged by all parties participating in the target service only if the service data is consistent with the digest stored in the blockchain.

In this implementation of the present application, in response to determining that the service request passes the consensus verification, one or more consensus nodes can be responsible for sending the service data to the service node for storage or instructing the service node to store the service data. The consensus node, an executor of the present method, can conduct this work on behalf of each consensus node.

To be specific, in response to determining that the service request passes the consensus verification, the consensus node can send the service data to at least one service node so that the service node stores the service data in the private database corresponding to the service node.

Or, the consensus node can send a storage instruction to at least one service node so that the service node stores the service data in the private database corresponding to the service node.

Or, the consensus node can send an acknowledgement instruction to a service node initiating the target service, so that the service node stores the service data in the private database corresponding to the service node, and send the service data to another service node so that the other service node stores the service data in a private database corresponding to the other service node.

Because the service node initiating the target service can broadcast the service data to the other service node in advance, the consensus node sometimes does not need to send the service data to the service node, but only needs to send a notifying storage instruction or an acknowledgement instruction.

In conclusion, in response to determining that the service request passes the consensus verification, each service node can learn of this information and choose to store the service data by itself. The present application does not limit a specific implementation.

Figure 2:
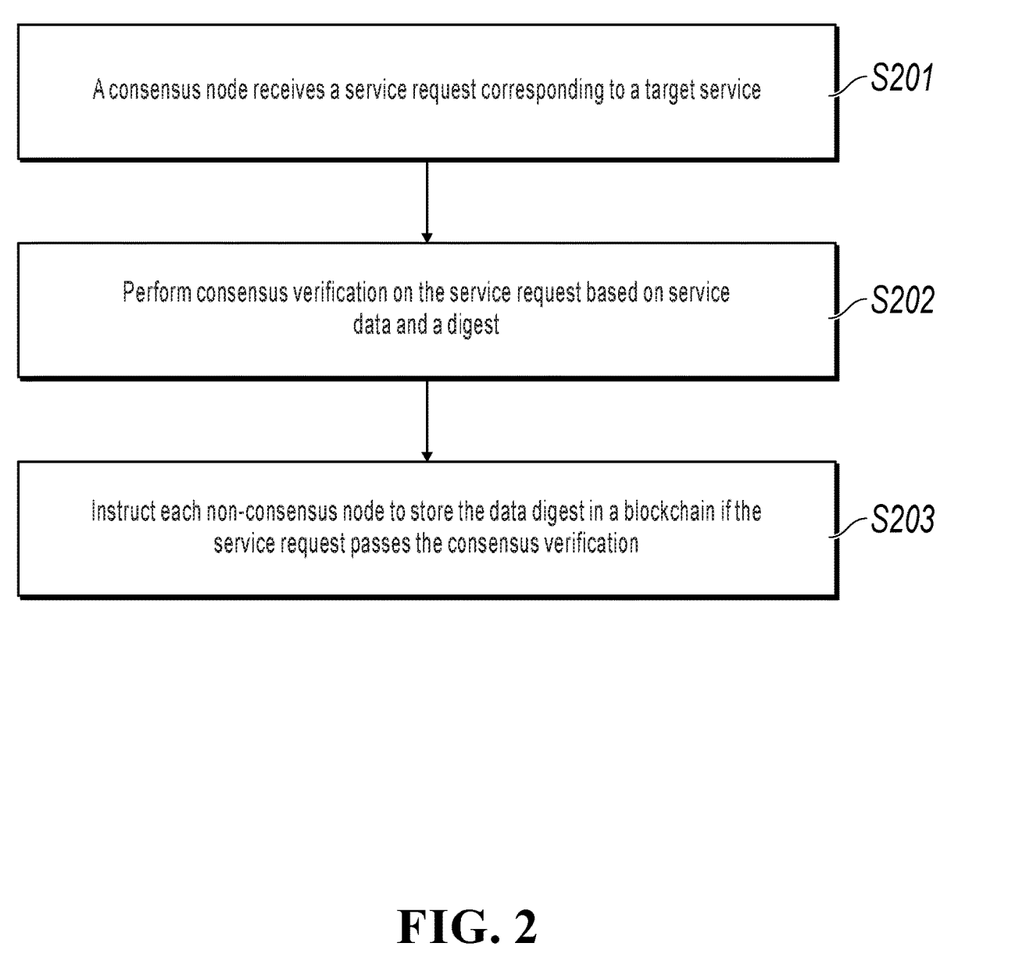
FIG. 2 is a flowchart illustrating another method for processing a service request, according to an implementation of the present application.

FIG. 2 is a flowchart illustrating another method for processing a service request, according to an implementation of the present application. The method for processing a service request includes the following steps:

S201. A consensus node receives a service request corresponding to a target service, where the service request includes service data of the target service and a digest of the service data.

S202. Perform consensus verification on the service request based on the service data and the digest.

S203. Instruct each non-consensus node to store the digest in a blockchain in response to determining that the service request passes the consensus verification.

In this implementation of the present application, the consensus node can be responsible for only consensus verification, and does not serve as a service node to participate in the target service. The non-consensus node cannot participate in the consensus verification, and can serve as only a service node to participate in the target service.

In this implementation of the present application, the consensus node may not maintain a blockchain, and is only responsible for performing consensus verification on a service request. The non-consensus node maintains a blockchain and stores, into the blockchain, the data included in the service request passing the consensus verification.

To be specific, the consensus node instructs each non-consensus node to store the digest in the blockchain in response to determining that the service request passes the consensus verification.

If a digest broadcast by a non-consensus node initiating a target service has been received by each non-consensus node before the consensus verification, the non-consensus node can directly store the digest in the blockchain after receiving a notification from the consensus node.

If the non-consensus node does not obtain the digest before the consensus verification, the consensus node can send the digest to the non-consensus node after the service request passes the consensus verification, so that the non-consensus node stores the digest in the blockchain.

In addition, the consensus node can further send the service data to at least one service node so that the service node stores the service data in a private database corresponding to the service node.

Or, the consensus node sends a storage instruction to at least one service node, so that the service node stores the service data in a private database corresponding to the service node.

Or, the consensus node can send an acknowledgement instruction to a service node initiating the target service so that the service node stores the service data in the private database corresponding to the service node, and send the service data to another service node so that the other service node stores the service data in a private database corresponding to the other service node.

It is worthwhile to note that the service node is a blockchain node participating in the target service.

Figure 3:
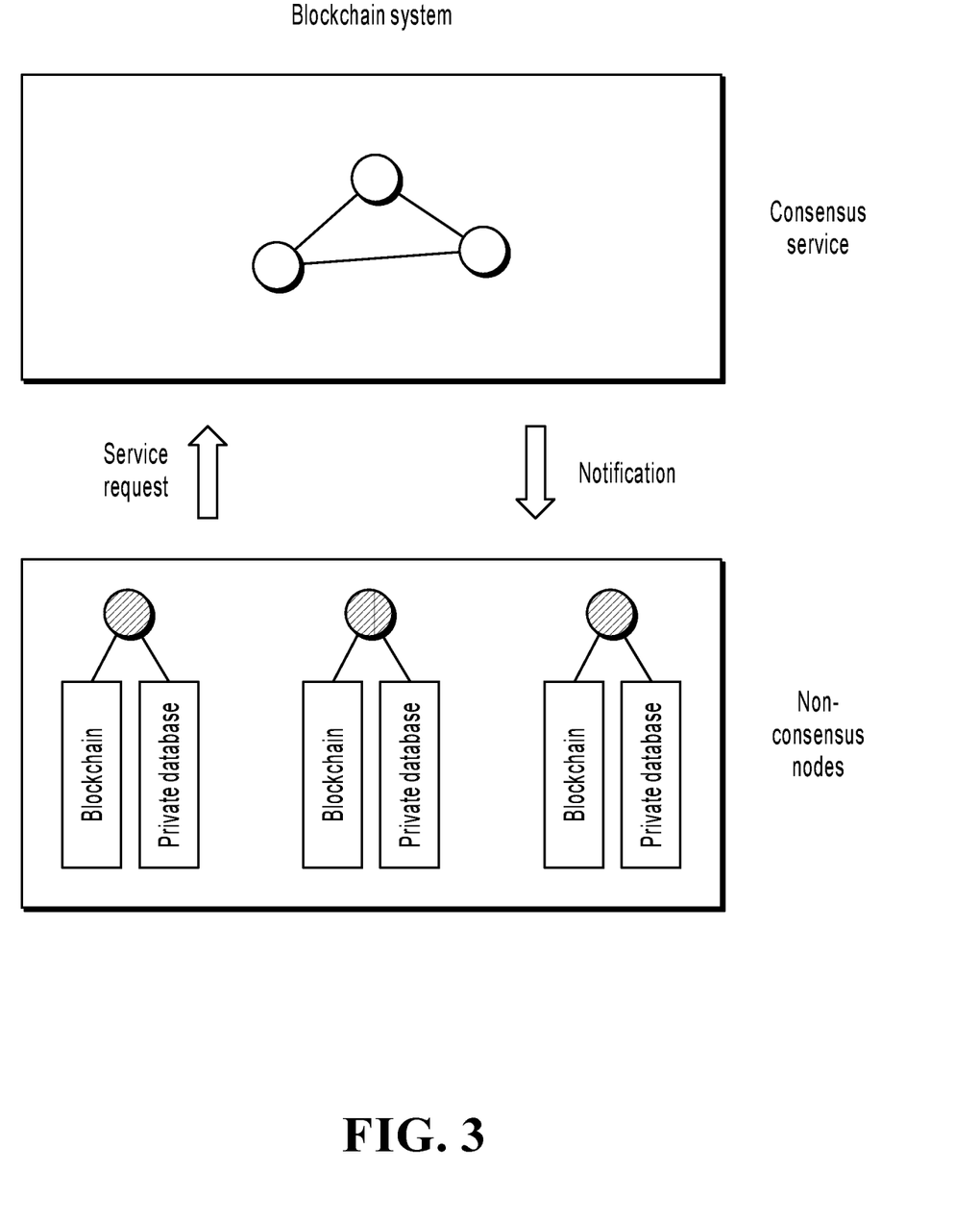
FIG. 3 is a schematic diagram illustrating a blockchain system, according to an implementation of the present application.

FIG. 3 is a schematic diagram illustrating a blockchain system, according to an implementation of the present application. As shown in FIG. 3, each consensus node (a blank node) is responsible for providing a consensus verification service for each non-consensus node (a shaded node). Each non-consensus node maintains both a blockchain and its own private database.

Each consensus node provides a consensus service in the following method: performing consensus verification on service data included in a received service request and a digest of the service data; and storing the digest in a blockchain after the service request passes the verification so that the service node stores the service data (the service node may not store the service data).

As such, a trustworthy consensus network provides an endorsement for each target service passing consensus verification, and the target service corresponding to the digest stored in the blockchain is authentic and trustworthy for each blockchain node in the entire blockchain network. If disputes arise between service nodes participating in a same target service, a digest corresponding to the target service and stored in the blockchain can always prevent denial of malicious service nodes.

Figure 4:
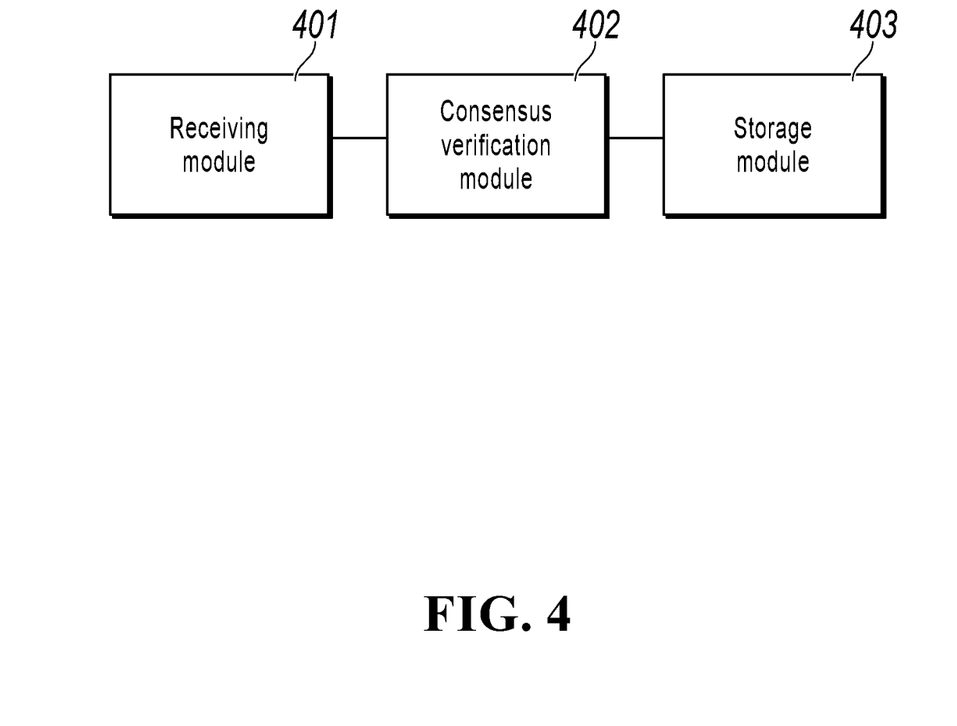
FIG. 4 is a schematic diagram illustrating a device for processing a service request, according to an implementation of the present application.

Based on the method for processing a service request shown in FIG. 1, an implementation of the present application further provides a corresponding device for processing a service request. As shown in FIG. 4, the device for processing a service request includes a receiving module 401, a consensus verification module 402, and a storage module 403.

The receiving module 401 is configured to receive a service request corresponding to a target service. The service request includes service data of the target service and a digest of the service data.

The consensus verification module 402 is configured to perform consensus verification on the service request based on the service data and the digest.

The storage module 403 is configured to store the digest in a blockchain in response to determining that the service request passes the consensus verification.

The device further includes a sending module 404 configured to: in response to determining that the service request passes the consensus verification, send the service data to at least one service node so that the service node stores the service data in a private database corresponding to the service node; or send a storage instruction to at least one service node so that the service node stores the service data in a private database corresponding to the service node; or send an acknowledgement instruction to a service node initiating the target service so that the service node stores the service data in a private database corresponding to the service node, and send the service data to another service node so that the other service node stores the service data in a private database corresponding to the other service node.

The service node is a blockchain node participating in the target service.

Figure 5:
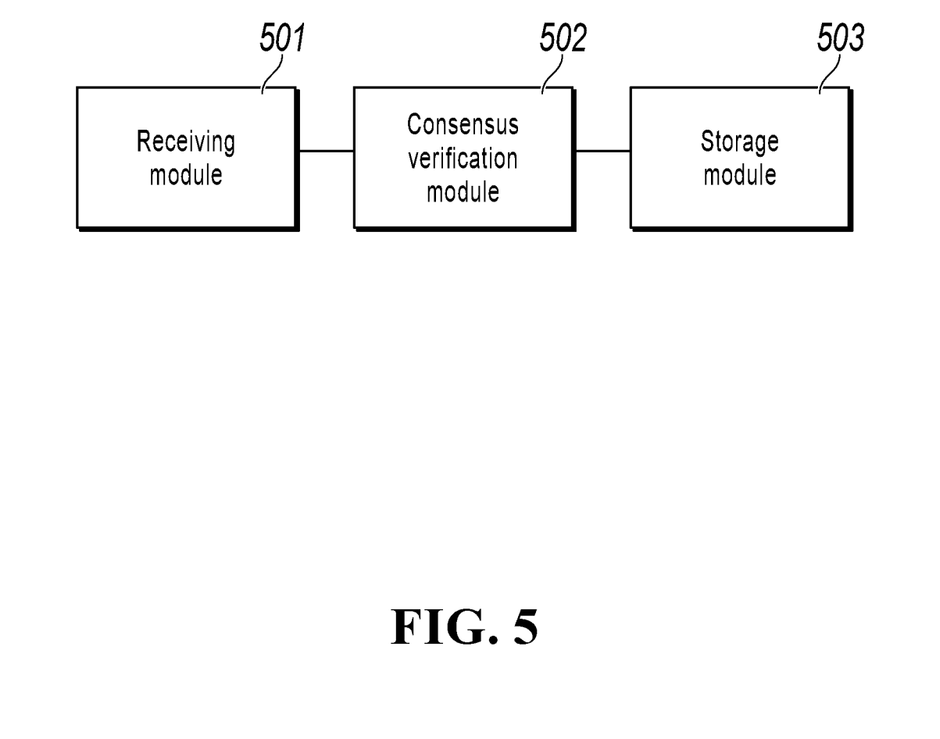
FIG. 5 is a schematic diagram illustrating another device for processing a service request, according to an implementation of the present application.

Based on the method for processing a service request shown in FIG. 2, an implementation of the present application further provides a corresponding device for processing a service request. As shown in FIG. 5, the device for processing a service request includes a receiving module 501, a consensus module 502, and a storage module 503.

The receiving module 501 is configured to receive a service request corresponding to a target service. The service request includes service data of the target service and a digest of the service data.

The consensus module 502 is configured to perform consensus verification on the service request based on the service data and the digest.

The storage module 503 is configured to instruct each non-consensus node to store the digest in a blockchain in response to determining that the service request passes the consensus verification.

The storage module 503 is configured to send the digest to each non-consensus node so that each non-consensus node stores the digest in the blockchain.

The device further includes a sending module 504 configured to send the service data to at least one service node so that the service node stores the service data in a private database corresponding to the service node; or send a storage instruction to at least one service node so that the service node stores the service data in a private database corresponding to the service node; or send an acknowledgement instruction to a service node initiating the target service so that the service node stores the service data in a private database corresponding to the service node, and send the service data to another service node so that the other service node stores the service data in a private database corresponding to the other service node.

The service node is a blockchain node participating in the target service.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as hardware description language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, the built-in microcontroller, etc. Therefore, the controller can be considered as a hardware component, and a device configured to implement various functions in the controller can also be considered as a structure in the hardware component. Or the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the device above is described by dividing functions into various units. Certainly, when the present application is implemented, a function of each unit can be implemented in one or more pieces of software and/or hardware.

A person skilled in the art should understand that an implementation of the present invention can be provided as a method, a system, or a computer program product. Therefore, the present invention can use a form of hardware only implementations, software only implementations, or implementations with a combination of software and hardware. Moreover, the present invention can use a form of a computer program product that is implemented on one or more computer-usable storage media (including but not limited to a disk memory, a CD-ROM, an optical memory, etc.) that include computer-usable program code.

The present invention is described with reference to the flowcharts and/or block diagrams of the method, the device (system), and the computer program product based on the implementations of the present invention. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine so that the instructions executed by the computer or the processor of the other programmable data processing device generate a device for implementing a specific function in one or more processes in the flowcharts and/or in one or more blocks in the block diagrams.

These computer program instructions can be stored in a computer readable memory that can instruct the computer or the other programmable data processing device to work in a specific way so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device so that a series of operations and operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to: a parameter random access memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so that a process, a method, a product or a device that includes a list of elements not only includes those elements but also includes other elements that are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A method for processing a service request, comprising:
receiving, by a consensus node, a service request corresponding to a target service, wherein the service request comprises service data of the target service and a digest of the service data;
performing, by the consensus node, consensus verification on the service request based on the service data and the digest;
storing, by the consensus node, the digest in a blockchain in response to determining that the service request passes the consensus verification; and
sending, by the consensus node, the service data to at least one service node so that the service node stores the service data in a private database corresponding to the service node; or
sending, by the consensus node, a storage instruction to at least one service node so that the service node stores the service data in a private database corresponding to the service node; or
sending, by the consensus node, an acknowledgement instruction to a service node initiating the target service so that the service node stores the service data in a private database corresponding to the service node; and sending the service data to another service node so that the other service node stores the service data in a private database corresponding to the other service node, wherein the service node is a blockchain node participating in the target service.

2. A method for processing a service request, comprising:
receiving, by a consensus node, a service request corresponding to a target service, wherein the service request comprises service data of the target service and a digest of the service data;
performing, by the consensus node, consensus verification on the service request based on the service data and the digest;
instructing, by the consensus node, each non-consensus node to store the digest in a blockchain in response to determining that the service request passes the consensus verification; and
sending, by the consensus node, the service data to at least one service node so that the service node stores the service data in a private database corresponding to the service node; or
sending, by the consensus node, a storage instruction to at least one service node so that the service node stores the service data in a private database corresponding to the service node; or
sending, by the consensus node, an acknowledgement instruction to a service node initiating the target service so that the service node stores the service data in a private database corresponding to the service node; and sending the service data to another service node so that the other service node stores the service data in a private database corresponding to the other service node, wherein the service node is a blockchain node participating in the target service.

3. The method according to claim 2, wherein the instructing each non-consensus node to store the digest in a blockchain comprises:
sending the digest to each non-consensus node so that each non-consensus node stores the digest in the blockchain.

4. An apparatus for processing a service request, comprising:
a receiving module, configured to receive a service request corresponding to a target service and received by a consensus node, wherein the service request comprises service data of the target service and a digest of the service data;
a consensus verification module, configured to perform consensus verification on the service request based on the service data and the digest;
a storage module, configured to store the digest in a blockchain in response to determining that the service request passes the consensus verification; and
a sending module, configured to: in response to determining that the service request passes the consensus verification, send the service data to at least one service node so that the service node stores the service data in a private database corresponding to the service node; or send a storage instruction to at least one service node so that the service node stores the service data in a private database corresponding to the service node; or send an acknowledgement instruction to a service node initiating the target service so that the service node stores the service data in a private database corresponding to the service node, and send the service data to another service node so that the other service node stores the service data in a private database corresponding to the other service node, wherein the service node is a blockchain node participating in the target service.

5. An apparatus for processing a service request, comprising:
a receiving module, configured to receive a service request corresponding to a target service, wherein the service request comprises service data of the target service and a digest of the service data;
a consensus module, configured to perform consensus verification on the service request based on the service data and the digest;
a storage module, configured to instruct each non-consensus node to store the digest in a blockchain in response to determining that the service request passes the consensus verification; and
a sending module, configured to: send the service data to at least one service node so that the service node stores the service data in a private database corresponding to the service node; or send a storage instruction to at least one service node so that the service node stores the service data in a private database corresponding to the service node; or send an acknowledgement instruction to a service node initiating the target service so that the service node stores the service data in a private database corresponding to the service node, and send the service data to another service node so that the other service node stores the service data in a private database corresponding to the other service node, wherein the service node is a blockchain node participating in the target service.

6. The apparatus according to claim 5, wherein the storage module sends the digest to each non-consensus node so that each non-consensus node stores the digest in the blockchain.

\* \* \* \* \*